United States Patent
Nayak et al.

(10) Patent No.: US 11,650,758 B2
(45) Date of Patent: May 16, 2023

(54) DATA STORAGE DEVICE AND METHOD FOR HOST-INITIATED CACHED READ TO RECOVER CORRUPTED DATA WITHIN TIMEOUT CONSTRAINTS

(71) Applicant: Western Digital Technologies, Inc., San Jose, CA (US)

(72) Inventors: Dattatreya Nayak, Karnataka (IN); Arun Kumar Shukla, Bangalore (IN); Akash Dungrani, Gujarat (IN)

(73) Assignee: Western Digital Technologies, Inc., San Jose, CA (US)

( * ) Notice: Subject to any disclaimer, the term of this patent is extended or adjusted under 35 U.S.C. 154(b) by 6 days.

(21) Appl. No.: 17/313,793

(22) Filed: May 6, 2021

(65) Prior Publication Data

US 2022/0357878 A1 Nov. 10, 2022

(51) Int. Cl.
*G06F 3/06* (2006.01)
*G06F 12/0802* (2016.01)

(52) U.S. Cl.
CPC .......... *G06F 3/0659* (2013.01); *G06F 3/0604* (2013.01); *G06F 3/0679* (2013.01); *G06F 12/0802* (2013.01); *G06F 2212/60* (2013.01); *G06F 2212/7203* (2013.01)

(58) Field of Classification Search
CPC .... G06F 3/0659; G06F 3/0604; G06F 3/0679; G06F 12/0802; G06F 2212/60; G06F 2212/7203
USPC ....................................................... 711/118
See application file for complete search history.

(56) References Cited

U.S. PATENT DOCUMENTS

| | | | |
|---|---|---|---|
| 7,408,834 B2 | 8/2008 | Conley et al. | |
| 10,025,532 B2 | 7/2018 | Manohar et al. | |
| 10,387,078 B1 | 8/2019 | Benisty | |
| 10,489,295 B2 | 11/2019 | Nellans et al. | |
| 2015/0134885 A1* | 5/2015 | Yeung | G06F 12/0246 711/103 |
| 2016/0011964 A1* | 1/2016 | Rostoker | G06F 12/0215 711/103 |
| 2016/0070647 A1* | 3/2016 | Shigeta | G06F 12/0862 711/103 |
| 2017/0168714 A1* | 6/2017 | Saha | G06F 3/067 |
| 2020/0333975 A1 | 10/2020 | Benisty | |

* cited by examiner

*Primary Examiner* — Hua J Song
(74) *Attorney, Agent, or Firm* — Crowell & Moring LLP

(57) ABSTRACT

A data storage device and method for host-initiated cached read to recover corrupted data within timeout constraints are provided. In one embodiment, a data storage device is provided comprising a volatile memory, a non-volatile memory, and a controller. The controller is configured to receive a read look-ahead command from a host to perform a read look-ahead of a first logical address; receive a read command from the host to read a second logical address; and execute the read look-ahead command by performing the following as background operations while executing the read command: read data for a location in the non-volatile memory that corresponds to the first logical address; correct an error in the data; and cache the corrected data in the volatile memory. The cached corrected data can be sent back to the host in response to the host requesting a read of the same logical address. Other embodiments are provided.

20 Claims, 6 Drawing Sheets

DATA STORAGE DEVICE AND METHOD FOR HOST-INITIATED CACHED READ TO RECOVER CORRUPTED DATA WITHIN TIMEOUT CONSTRAINTS

BACKGROUND

A data storage device can be used to store data from a host. Many different protocols can be used, such as the Non-Volatile Memory Express (NVMe) protocol and the Secure Digital (SD) protocol. Some data storage devices can operate under multiple protocols (e.g., both NVMe and SD).

DETAILED DESCRIPTION

Overview

Figure 1A:
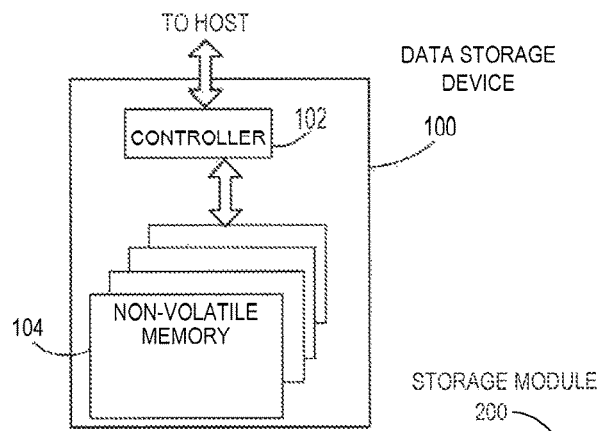
FIG. 1A is a block diagram of a data storage device of an embodiment.

By way of introduction, the below embodiments relate to a data storage device and method for host-initiated cached read to recover corrupted data within timeout constraints. In one embodiment, a data storage device is provided comprising a volatile memory, a non-volatile memory, and a controller. The controller is configured to receive a read look-ahead command from a host to perform a read look-ahead of a first logical address; receive a read command from the host to read a second logical address; and execute the read look-ahead command by performing the following as background operations while executing the read command: read data for a location in the non-volatile memory that corresponds to the first logical address; correct an error in the data; and cache the corrected data in the volatile memory.

In some embodiments, the controller is further configured to: operate in either a first protocol or a second protocol, each protocol having a different timeout constraint; correct the error within the timeout constraint of the first protocol but not within the timeout constraint of the second protocol; and receive the read look-ahead command from the host in response to the controller operating in the second protocol.

In some embodiments, the first protocol comprises Non-Volatile Memory Express (NVMe) and the second protocol comprises Secure Digital (SD).

In some embodiments, the controller is further configured to throttle an incoming host command to provide enough time for the controller to correct the error in the data.

In some embodiments, the controller comprises a front-end module and a back-end module, and the controller is further configured to throttle the incoming host command by sending a throttle command from the back-end module to the front-end module.

In some embodiments, the controller is further configured to receive a read command from the host to read the first logical address and, in response, provide the host with the corrected data from the volatile memory.

In some embodiments, the controller is further configured to correct the error using an XOR recovery operation.

In some embodiments, the controller is further configured to form first and second logical groups in the non-volatile memory, each logical group having a different level of error protection; and the first logical address is in the first logical group and the second logical address is in the second logical group.

In some embodiments, the first logical group is designated for file system data or a boot partition; and the second logical group is designated for user data.

In some embodiments, the non-volatile memory comprises a three-dimensional memory.

In another embodiment, a method is provided that is performed in a host in communication with a data storage device comprising a memory. The method comprises: determining whether the data storage device is operating in a first protocol or a second protocol, wherein the first and second protocols have different timeout constraints and an error correction operation exceeds the timeout constraint of the second protocol; and in response to determining that the data storage device is operating in the second protocol, sending, to the data storage device, a read look-ahead command for a first logical address to be performed as a background operation of a read command for a second logical address.

In some embodiments, the method further comprises: sending, to the data storage device, a read command to read the first logical address; and receiving, from the data storage device, data that was corrected by the error correction operation and cached in response to the read look-ahead command.

In some embodiments, the data is cached in a transfer buffer of the data storage device.

In some embodiments, the memory comprises a three-dimensional memory.

In some embodiments, the first protocol comprises Non-Volatile Memory Express (NVMe) and the second protocol comprises Secure Digital (SD).

In some embodiments, the method further comprises receiving a request from the data storage device to throttle an incoming host command to provide the data storage device with enough time to perform an error correction operation on data read in response to the read look-ahead command.

In some embodiments, the error correction operation comprises an XOR recovery operation.

In some embodiments, the method further comprises sending, to the data storage device, a command to form first and second logical groups in the memory of the data storage device, wherein the first and second logical groups have different levels of error protection.

In some embodiments, the first logical group is designated for file system data or a boot partition, and the second logical group is designated for user data.

In another embodiment, a data storage device is provided comprising: a volatile memory; a non-volatile memory; means for receiving a read look-ahead command from a host to perform a read look-ahead of a first logical address in the non-volatile memory; means for receiving a read command from the host to read a second logical address in the non-volatile memory; and means for executing the read look-ahead command by performing the following as background operations while executing the read command: read data from the first logical address in the non-volatile memory; correct an error in the data; and cache the corrected data in the volatile memory.

Other embodiments are possible, and each of the embodiments can be used alone or together in combination. Accordingly, various embodiments will now be described with reference to the attached drawings.

EMBODIMENTS

The following embodiments relate to a data storage device (DSD). As used herein, a "data storage device" refers to a device that stores data. Examples of DSDs include, but are not limited to, hard disk drives (HDDs), solid state drives (SSDs), tape drives, hybrid drives, etc. Details of example DSDs are provided below.

Figure 1B:
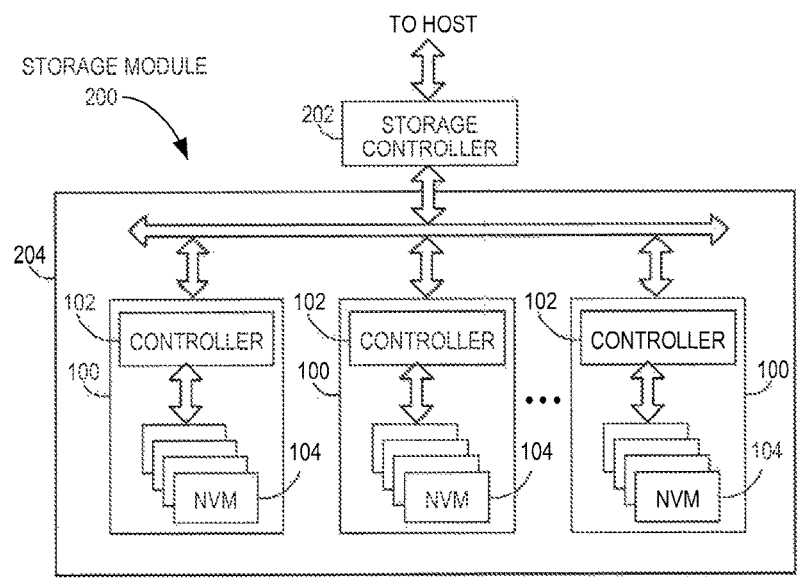
FIG. 1B is a block diagram illustrating a storage module of an embodiment.
Figure 1C:
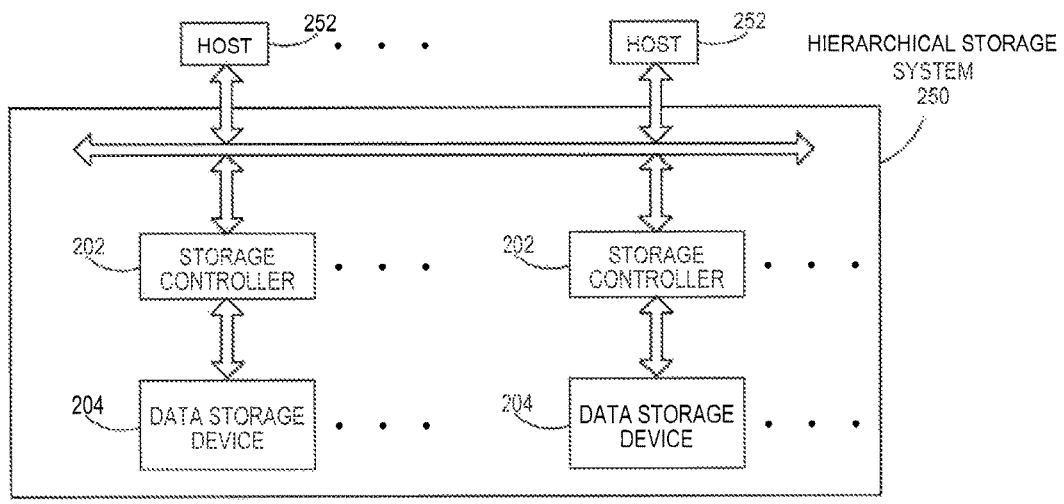
FIG. 1C is a block diagram illustrating a hierarchical storage system of an embodiment.

Data storage devices suitable for use in implementing aspects of these embodiments are shown in FIGS. 1A-1C. FIG. 1A is a block diagram illustrating a data storage device 100 according to an embodiment of the subject matter described herein. Referring to FIG. 1A, data storage device 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
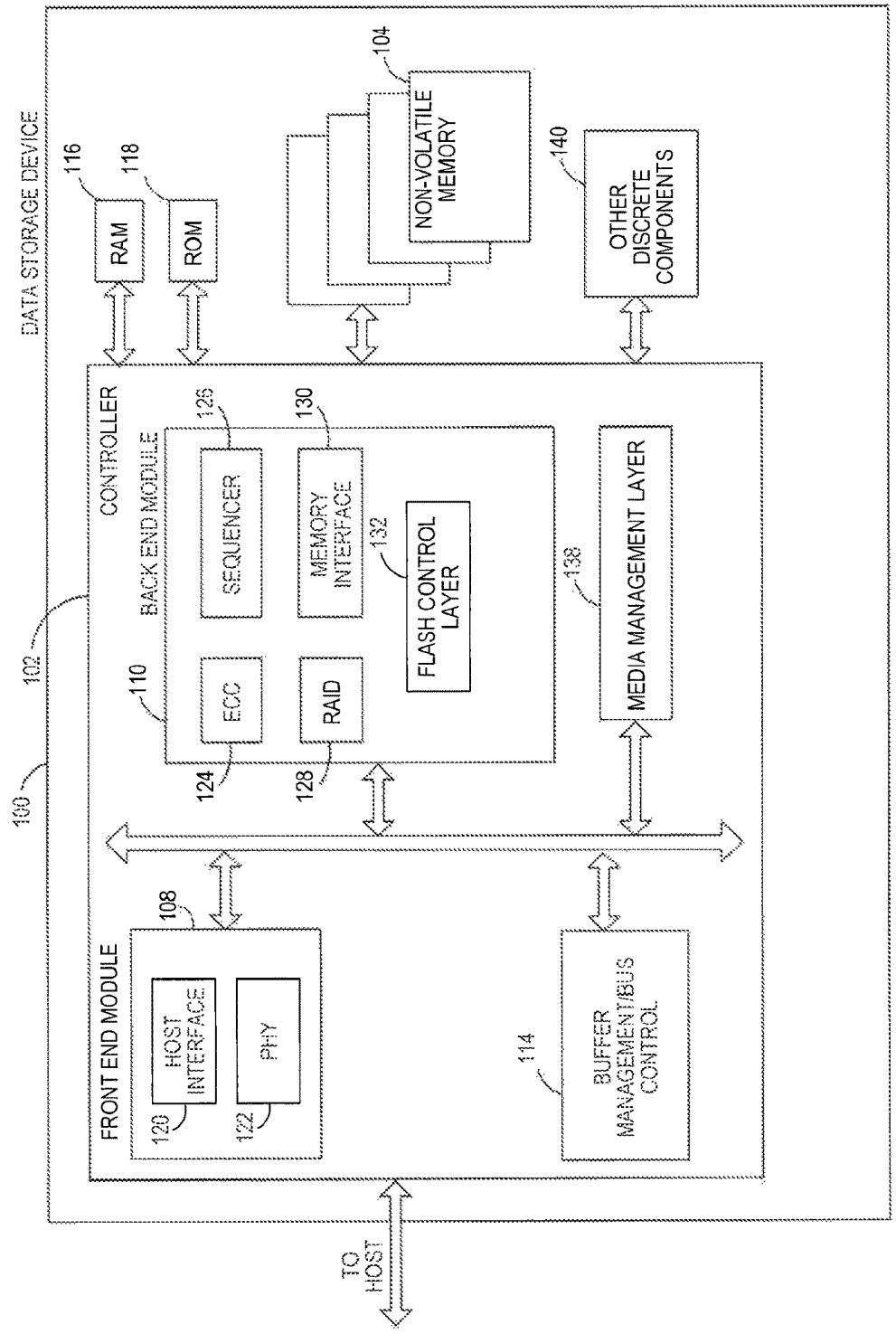
FIG. 2A is a block diagram illustrating components of the controller of the data storage device illustrated in FIG. 1A according to an embodiment.

FIG. 2A is a block diagram illustrating components of controller 102 in more detail. Controller 102 includes a front-end module 108 that interfaces with a host, a back-end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Also, "means" for performing a function can be implemented with at least any of the structure noted herein for the controller and can be pure hardware or a combination of hardware and computer-readable program code.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
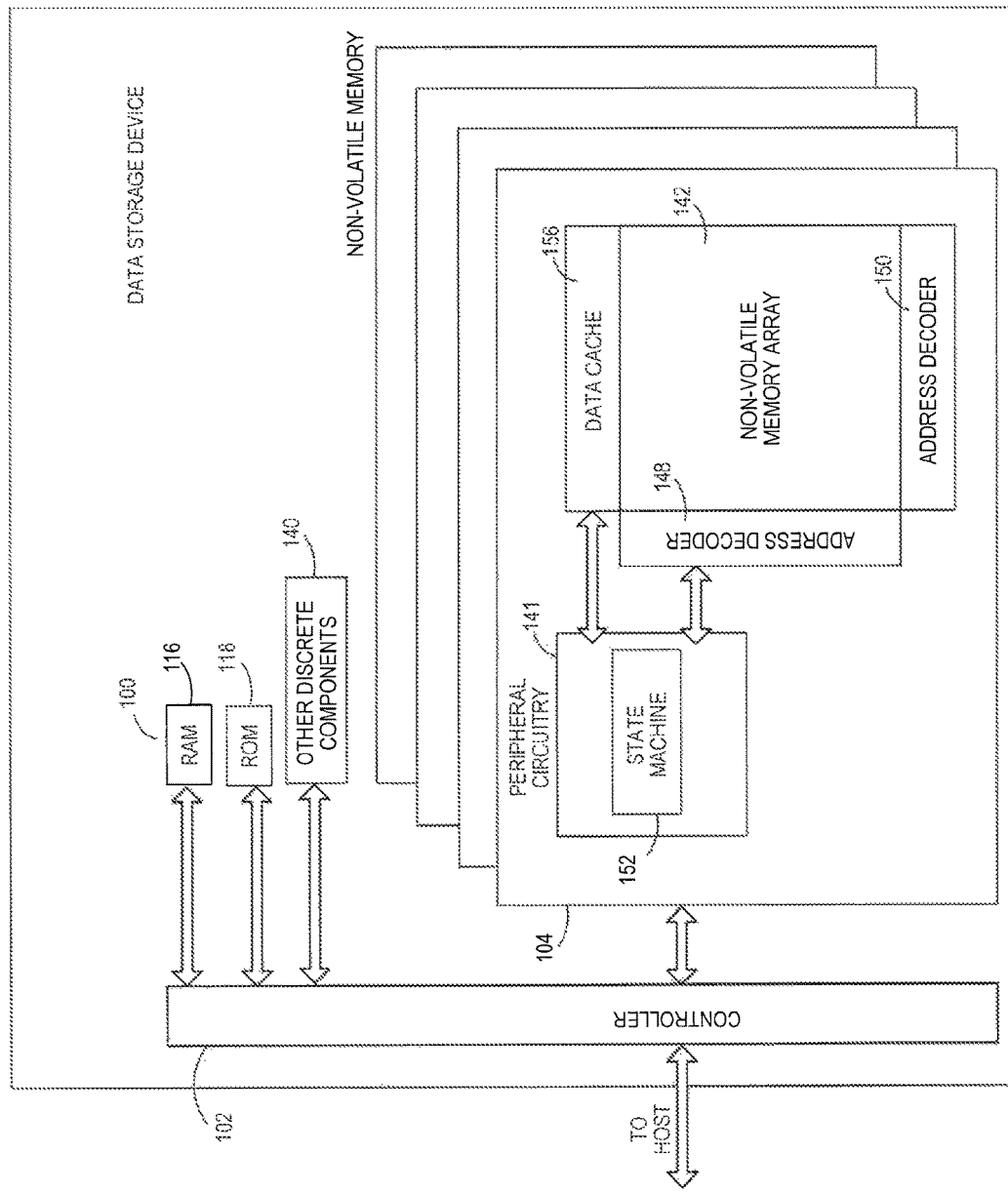
FIG. 2B is a block diagram illustrating components of the memory data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
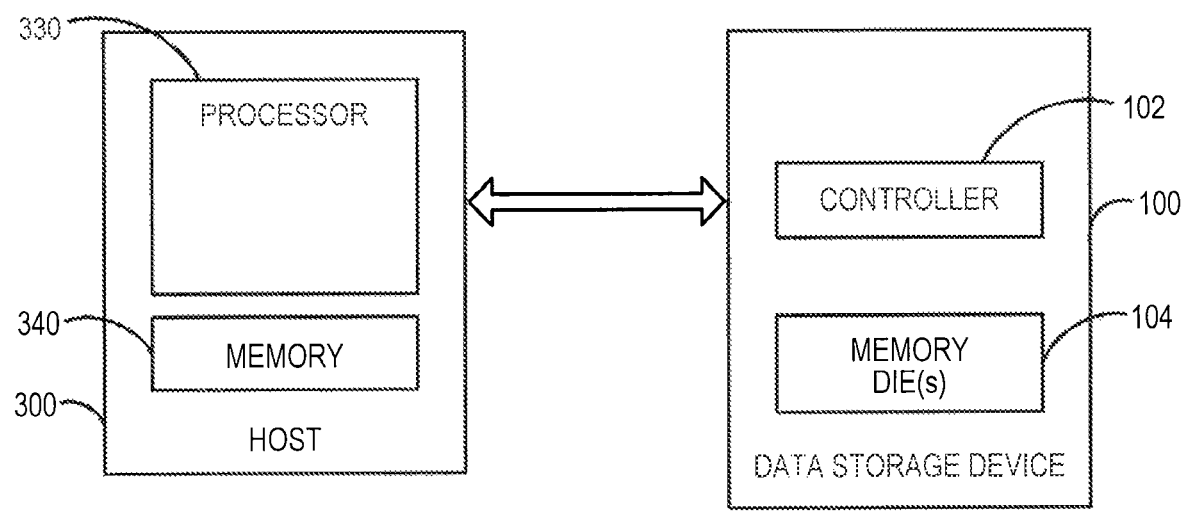
FIG. 3 is a block diagram of a host and data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to perform the acts described herein. So, actions performed by the host 300 are sometimes referred to herein as being performed by an application (computer-readable program code) run on the host 300.

Multi-protocol, removable data storage devices are emerging in the consumer market, attributing to the advancement in technology, which can reach primary storage level performance in computing devices, and enabling exceptional user experience for multi-processing environments. These data storage devices can support both slow and fast hosts. For example, an SD Express card is a data storage device that supports two protocols: SD and NVMe. In this way, the data storage device can offer NVMe capabilities alongside a legacy SD interface.

Housing two protocols in the same data storage device can lead to some bottlenecks in performance, as these protocols have their own sets of standards in terms of power consumption, hardware requirements, and timeout constraints. They also can differ in read, write, and erase operations. Further, these data storage devices can support different levels of data protection and recovery for the same data, as specified by the protocols. For example, a dataset can be written in NVMe mode with a read timeout defined in multiples of 100 milliseconds (ms). That means a dataset in NVMe can have a one-second timeout, and the data storage device can store the data with a very good protection level, such as XOR, for example. The data can be recovered in NVMe mode within a one-second timeout. In this duration, the data storage device can perform a maximum and extensive level of recovery in case of data corruption and retention issues. However, if the same data storage device is plugged into an SD host where read timeouts are limited to a maximum of 100 ms, as per the SD protocol, it may not be possible correct errors in data if the data recovery process will take more than 100 ms. So, there can be situations in which data is recoverable in NVMe mode, but the same data is not recoverable in SD mode.

This problem can occur, for example, when a host divides available storage space in the memory of the data storage device into different logical groups (datasets), which are classified for different protection as per the data type. For example, one dataset can be for a host file system/boot partition, where maximum protection is provided against data loss. User data, which may not be as important, can be categorized into a less-important dataset with lower protection. Even though the dataset for the host file system/boot partition is provided with the maximum protection, data recovery can be compromised when there is a mode switch. That is, data written with the highest protection in NVMe mode with a larger timeout may not be able to be recovered in SD mode, even though the data can be recovered in NVMe mode.

The following embodiments can be used to address this issue. In general, with these embodiments, the host 300 can initiate a look-ahead read request, after which the controller 102 (e.g., firmware) in the data storage device 100 can start the read process and, if necessary, perform error recovery (e.g., in the background of a regular read operation, throttling other host commands, if necessary). The corrected data is cached in volatile memory 116 in the data storage device 100. When the host 300 officially requests a read of the data, the controller 102 returns the corrected data cached in the volatile memory 116 instead of reading the data from the non-volatile memory 104 and then correcting it. By correcting the data before it is officially requested, these embodiments avoid the situation of not being able to correct the data due to a timeout constraint.

The following paragraphs provide one example implementation. It should be noted that this is just one example and other implementations can be used. In this example, in NVMe mode, write (>250 ms of SD) and read (>100 ms of SD) timeouts are defined for every dataset. Each dataset comprises a starting logical block address (LBA), a length of logical blocks that the range consists of, and context attributes, which specify how the range has to be used by host software. An Access Latency (AL) attribute, provides latency information. In SD Mode, the complete LBA range is seen as a namespace and a single dataset. Write (250 ms) and read (100 ms) timeouts are part of the specification and, hence, cannot be modified.

In this example, XOR accumulation and XOR recovery are part of the host data protection scheme for better recovery in case of host data loss. XOR accumulation assists in storing and managing parity data for blocks, and XOR recovery is used to recover uncorrectable data, using the parity bins and XOR properties for blocks of memory 104. For blocks in SD mode, XOR accumulation takes place, and parity data is stored in the block, which means data can be recovered using the XOR mechanism for both open and closed blocks, even when actual data is corrupted in the device 100. Timeout constraints can cause XOR recovery not to be performed. The same hardware is available to both protocols.

In one embodiment, for a current active read, XOR recovery is not performed. However, for the next read, if cached in the background, XOR recovery can be performed, if needed. In this embodiment, the host 300 sends an intimation "look-ahead" command with the desired range of LBAs. Upon receiving this command, the controller 102 (e.g., firmware) can start the process of reading the data from locations in the memory 104 associated with the LBAs in the background of the active read. If the controller 102 detects any errors in the look-ahead reads, the controller 102 can throttle the host 300 to slow or prevent the host 300 from sending additional commands to the data storage device 100. This provides time for the controller 102 to perform the data recovery operation and compute the necessary error correction required. XOR recovery can be performed to recover data if an uncorrectable error correction code (UECC) has occurred and within the timing constraints, so the data can be transferred back to the host 300.

Figure 4:
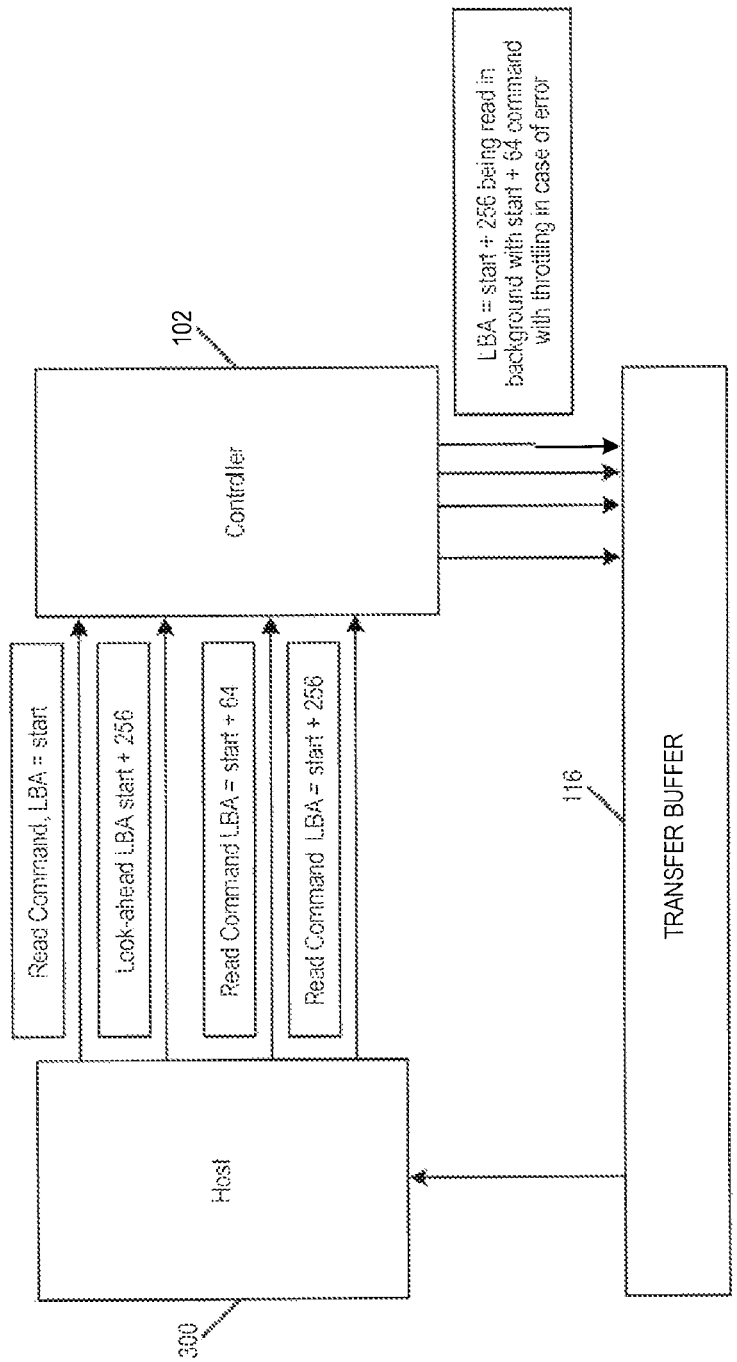
FIG. 4 is a block diagram illustrating a method of an embodiment for a host-initiated cached read to recover corrupted data within timeout constraints.

An example of this process is illustrated in FIG. 4. As shown in FIG. 4, after the host 300 sends a read command for a starting LBA, the host 300 sends a read look-ahead command for a first LBA ("start +256"). The host 300 then sends another regular read command for a second LBA ("start +64"). While the data storage device 100 is processing the read command for the second LBA, it performs the read look-ahead for the first LBA in the background. With a read look-ahead, the controller 102 reads the data from the location in the memory associated with the first LBA (e.g., after looking up the physical address associated with the first LBA in the logical-to-physical address table). Instead of sending that data to the host 300, the controller 102 stores the data in volatile memory, which is sometimes referred to herein as RAM or a transfer buffer 115. So, the result of the read command and read look-ahead command is that the data from the second LBA is sent to the host 300, while the data from the first LBA is stored in the volatile memory 116 and not returned to the host 300 at the conclusion of the command. When the host 300 later sends a read command to the data storage device 100 to read the first LBA ("start +256"), the controller 102 sends the data stored in the volatile memory 116 to the host 300 (i.e., the controller 102 does not re-read the data from the non-volatile memory 104).

As mentioned above, the advantage of performing the read look-ahead is that it gives the controller 102 more time than the allotted timeout period for a regular read command to perform error correction on the data. So, using this embodiment, data that would otherwise not be corrected by the controller 102 due to a timeout constraint of a read command can be corrected. That is, the read look-ahead may be not limited to the timeout constraint of a regular read command. Also, as noted in FIG. 4, to the extent the controller 102 needs more time to correct the data, the controller 102 can throttle (i.e., slow or prevent) future commands from the host 300 to give the controller 102 more time to perform the data correction operations.

Figure 5:
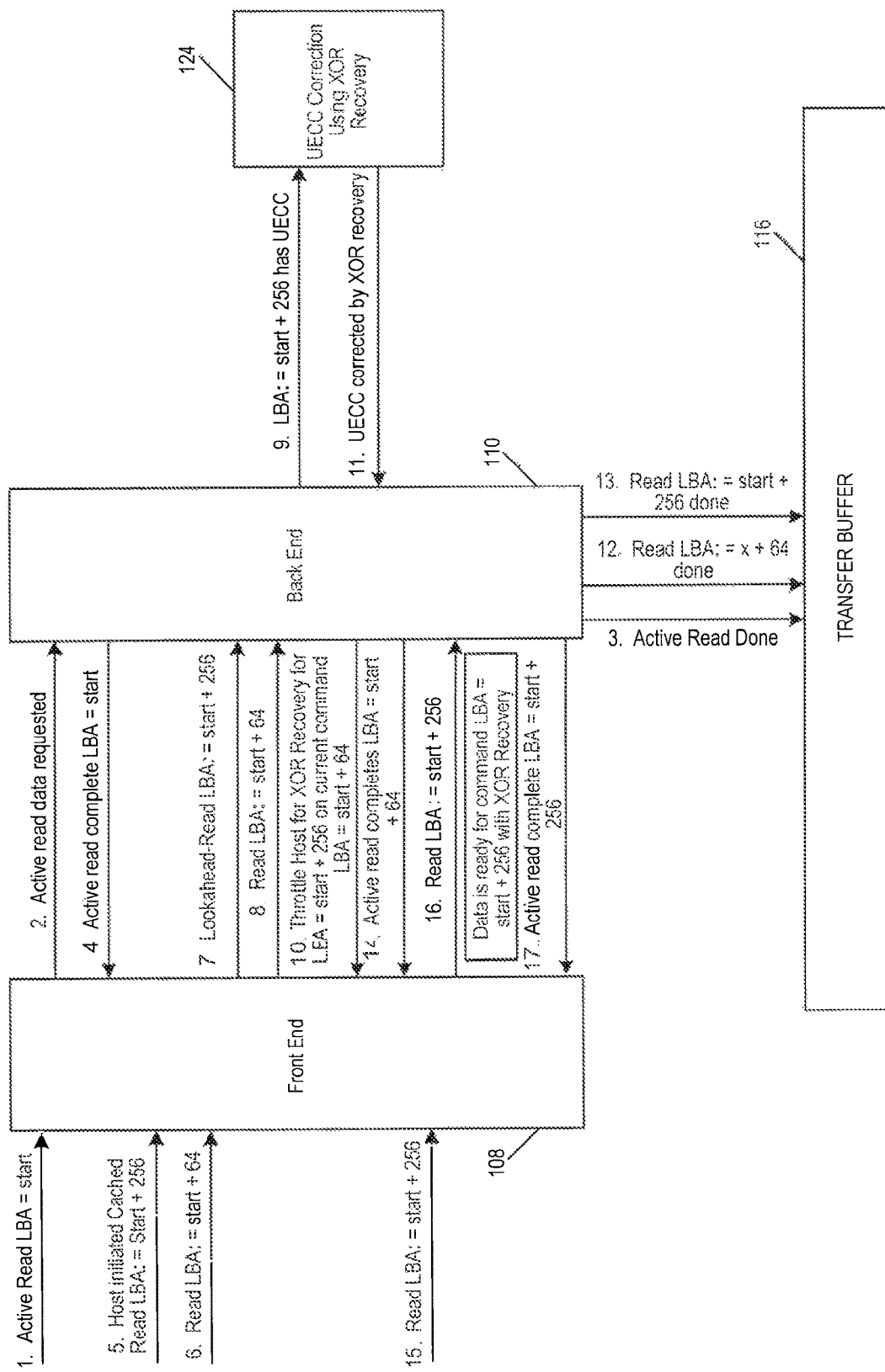
FIG. 5 is a more-detailed block diagram illustrating a method of an embodiment for a host-initiated cached read to recover corrupted data within timeout constraints.

FIG. 5 provides a more-detailed version of this example. As shown in FIG. 5, the front end module 108 of the controller 102 receives an active read command for LBA=start from the host 300 (act 1). The front end module 108 sends the request to the back end module 110 (act 2), which stores the data in the transfer buffer 116 after it is read from the non-volatile memory 104 (act 3). The back end module 110 then informs the front end module 108 that the active read is complete (act 4).

Next, the front end module 108 receives a host-initiated cached read (read look-ahead) request for LBA=start +256 (act 5), as well as another active read command for LBA=start+64 (act 6). The front end module 108 sends the two requests to the back end module 110 (acts 7 and 8). If the read look-ahead data has an uncorrectable error, the back end module 110 sends the data to the ECC module 124 for correction (act 9). Assuming more time is needed to correct the error than the timeout constraint on the active read command of LBA=start+64, the back end module 110 throttles the host 300 (act 10). When the ECC module 124 has corrected the data, it informs the back end module 110 (act 11), which stores the data in the transfer buffer 116, as well as the data from LBA=start+64 (acts 12 and 13). The back end module 110 then informs the front end module 108 that the active read is complete (act 14).

Later, the host 300 requests an actual read of the LBA it had previously requested a read-look ahead of. When that happens, the front end module 108 receives that request (act 15) and sends it to the back end module 110 (act 16). Since the data is in the transfer buffer 116 waiting to be sent, the back end module 110 responds by sending a message to the front end module 186 that the read is complete (act 17). The data is then transferred from the transfer buffer 116 to the host 300.

As illustrated by this example, if the controller 102 encounters an uncorrectable data during the active read in act 1, it cannot exercise the XOR recovery path due to timeout constraints. In contrast, using the look-ahead command for LBA=start+256, uncorrectable data in that LBA can be corrected during the active read of LBA=start+64, using throttling if needed. It should be noted that, in this example, the data storage device 100 does not predict on which LBA ranges to perform a read look-ahead. Instead, it is the responsibility of the host 300 to provide this special read look-ahead command with a desired LBA range. In other embodiments, the data storage device 100 can do the prediction.

There are many advantages associated with these embodiments. For example, with these embodiments, the host 300 can receive correct data, even if the data is corrupted, by performing recovery within an SD mode timeout limitation. Further, with these embodiments, the controller 102 (e.g., firmware) can perform in an efficient manner, when it knows the data that will be requested by the host 300 beforehand.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two-dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two-dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a volatile memory;
    a non-volatile memory; and
    a controller configured to:
        receive a read look-ahead command from a host to perform a read look-ahead of data of a first logical address;
        receive a read command from the host to read a second logical address;
        attempt to execute the read look-ahead command as a background operation while executing the read command;
        determine that the data read by the read look-ahead command comprises an error that requires more time to correct than a read timeout time of the read command;
        throttle an incoming host command to provide enough time for the controller to correct the error in the data;
        correct the error in the data; and
        cache the corrected data in the volatile memory.

2. The data storage device of claim 1, wherein the controller is further configured to operate in either a first protocol or a second protocol, each protocol having a different read timeout time.

3. The data storage device of claim 2, wherein:
    the first protocol comprises Non-Volatile Memory Express (NVMe); and
    the second protocol comprises Secure Digital (SD).

4. The data storage device of claim 1, wherein the controller is further configured to:
    receive a read command from the host to read the first logical address; and
    in response, provide the host with the corrected data from the volatile memory.

5. The data storage device of claim 1, wherein the controller is further configured to correct the error using an XOR recovery operation.

6. The data storage device of claim 1, wherein:
    the controller is further configured to form first and second logical groups in the non-volatile memory, each logical group having a different level of error protection; and
    the first logical address is in the first logical group and the second logical address is in the second logical group.

7. The data storage device of claim 6, wherein the first logical group is designated for file system data or a boot partition.

8. The data storage device of claim 6, wherein the first logical group is designated for a boot partition.

9. The data storage device of claim 6, wherein the second logical group is designated for user data.

10. The data storage device of claim 1, wherein the non-volatile memory comprises a three-dimensional memory.

11. A method comprising:
    performing the following in a host in communication with a data storage device comprising a memory:
        sending a read look-ahead command to the data storage device to perform a read look-ahead of data of a first logical address in the memory;
        sending a read command to the data storage device to read a second logical address in the memory, wherein the data storage device attempts to execute the read look-ahead command as a background operation while executing the read command and the data read by the read look-ahead command comprises an error that requires more time to correct than a read timeout time of the read command; and receiving a request from the data storage device to throttle a next command to be sent to the data storage device to provide the data storage device with enough time to perform an error correction operation on the data.

12. The method of claim 11, further comprising:
sending, to the data storage device, a read command to read the first logical address; and
receiving, from the data storage device, data that was corrected by the error correction operation and cached in response to the read look-ahead command.

13. The method of claim 12, wherein the data is cached in a transfer buffer of the data storage device.

14. The method of claim 11, wherein the memory comprises a three-dimensional memory.

15. The method of claim 11, wherein the error correction operation comprises an XOR recovery operation.

16. The method of claim 11, further comprising sending, to the data storage device, a command to form first and second logical groups in the memory of the data storage device, wherein the first and second logical groups have different levels of error protection.

17. The method claim 16, wherein:
the first logical group is designated for file system data or a boot partition; and
the second logical group is designated for user data.

18. The method of claim 11, wherein the data storage device is configured to operate in either a first protocol or a second protocol.

19. The method of claim 18, wherein:
the first protocol comprises Non-Volatile Memory Express (NVMe); and
the second protocol comprises Secure Digital (SD).

20. A data storage device comprising:
a volatile memory;
a non-volatile memory;
means for receiving a read look-ahead command from a host to perform a read look-ahead of data of a first logical address in the non-volatile memory;
means for receiving a read command from the host to read a second logical address in the non-volatile memory;
means for attempting to execute the read look-ahead command as a background operation while the read command;
means for determining that the data read by the read look-ahead command comprises an error that requires more time to correct than a read timeout time of the read command;
means for throttling an incoming host command to provide enough time for the controller to correct the error in the data;
means for correcting the error in the data; and
means for caching the corrected data in the volatile memory.

\* \* \* \* \*